INVENTOR
William T. Doyle
BY
Munson J. Hamilton
ATTORNEY

METHOD AND APPARATUS FOR SIZING SOLID PARTICLES

Filed April 5, 1962 5 Sheets-Sheet 2

INVENTOR

BY William T. Doyle

Munson H. Hamilton

ATTORNEY

May 21, 1963 W. T. DOYLE 3,090,487
METHOD AND APPARATUS FOR SIZING SOLID PARTICLES
Filed April 5, 1962 5 Sheets-Sheet 3

INVENTOR
William T. Doyle
BY
Munroe H. Hamilton
ATTORNEY

May 21, 1963 W. T. DOYLE 3,090,487

METHOD AND APPARATUS FOR SIZING SOLID PARTICLES

Filed April 5, 1962

Inventor:
William T. Doyle,
by [signature]
Attorney

May 21, 1963 W. T. DOYLE 3,090,487

METHOD AND APPARATUS FOR SIZING SOLID PARTICLES

Filed April 5, 1962 5 Sheets-Sheet 5

Inventor:
William T. Doyle,
by [signature]
Attorney

United States Patent Office 3,090,487 Patented May 21, 1963

3,090,487
METHOD AND APPARATUS FOR SIZING SOLID PARTICLES

William T. Doyle, Dorchester, Boston, Mass., assignor to Sturtevant Mill Company, Dorchester, Boston, Mass., a corporation of Massachusetts Filed Apr. 5, 1962, Ser. No. 186,820
8 Claims. (Cl. 209—139)

This invention relates to separating and classifying finely divided materials and in particular to an improved air classifying method and apparatus for processing a given mass of granular or pulverized material and removing from the mass one or more fractions whose component particles are of a predetermined fineness or lie within a narrow range of particle sizes. In one specific embodiment the invention is concerned with a method of continuously processing a protein bearing flour in order to remove a protein fraction which occurs in very small percentages of from 5% to 10% of the total mass of flour processed. The particles making up this protein are very small occurring in a range of sizes of from 2 or 3 microns, up to 10 to 15 microns.

The present application is a continuation-in-part of applications Serial No. 824,101, filed June 30, 1959; Serial No. 33,008, filed May 31, 1960; Serial No. 45,740, filed July 27, 1960 and Serial No. 123,357, filed July 3, 1961.

Air classifying of the type with which the present invention is concerned is carried out by causing a finely divided or ground material to fall onto rotatable distributor plate means. Particles are centrifugally displaced with relatively coarse particles being thrown outwardly a greater distance than relatively fine particles. A current of air is induced to flow upwardly through the cascading material and draw a desired range of relatively fine particles through selector blades and thence upwardly through a fan member. Thereafter, the fine particles pass down into an outer fine discharge conduit, while the coarser material, which was not lifted by the current of air, is allowed to fall through an inner tailings conduit. Ordinarily, the carrier air is recirculated and passes through openings extending between the inner and outer conduits.

In these conventional air classifying machines of this general type, two limiting conditions are encountered when attempting to remove very small fractions of extremely fine material. One condition is excessive speed of air flow induced by the fan. It should be understood that for practical reasons, the fan in such machines is directly connected to the same shaft which drives the centrifugal distributing plate from which a mass of unsized particles are required to be displaced outwardly. The speed of the shaft necessary for adequate centrifuging action necessarily results in a very powerful fan which tends to counteract the selectivity of the selector blades by inducing too rapid a flow of lifting air. The result is that a certain amount of coarser particles than desired are lifted and carried through the fan regardless of the setting of the selector blades and thus a desirable degree of selectivity is not realized.

A second condition is the tendency for carrier air as it passes down through the outer fines conduit to be drawn through space between return air vanes occurring between the inner and outer conduits and thus to become recirculated through the system. This operates to saturate the air undesirably with particles and to decrease significantly the capacity of the air for picking up and carrying away a relatively small fraction of very fine particles. Therefore, a loss of efficiency may occur in this way also.

It is a chief object of the invention to provide an improved method and apparatus for air classifying wherein small fractions of extremely fine material may be removed from a mass of relatively larger particles by means of a dual fines collecting system which produces two separate quantities of fines.

Another object is to control a flow of air induced by a classifier fan of the type which rotates with a centrifugal distributor plate so that particles coarser than those desired to be removed will not be carried up into the fan by reason of the circulation of air through the fan being retarded while the fan speed is maintained constant.

Another object of the invention is to provide a method and apparatus for furnishing a regulated flow of fresh carrier air whereby there is eliminated any recirculation through the system of portions of carrier air already containing fine particles.

I have discovered that the foregoing objectives may be realized by a method of air classifying which is based on the novel concept of operating a substantially sealed air classifier system with a controlled air discharge outlet and by further combining with this system a dual collecting apparatus. In this system control of flow of air is exercised at the pressure side of the fan to build up an increased static pressure or back pressure against which the fan is working. As a result the fan, even though rotating at a relatively high r.p.m. nevertheless does not move as great a volume of air through the system as it normally would do and thus cooperates with the rotary sizing blades to provide a unique selectivity for very fine particle separation. This may be accomplished by controlled valving of the air flow in the inlet or outlet pipes.

In order to provide for such control being maintained continuously, the system of the invention is constantly supplied with fresh amounts of air drawn in from points outside the classifier machine.

In supplying air in accordance with the invention I conduct a fan induced flow of air through a conduit directly into a sealed inner classifying compartment. From here the air is drawn upwardly into an outer conduit for the fines. The coarse particles drop into a second tailings conduit located inside of the fines conduit in spaced relation thereto. I provide for the tailings conduit being isolated from the fines conduit. Therefore, since there is no communication between the two, all of the fines which are lifted by the fan are carried over and passed through the fines conduit and only fresh air ever passes through the cascading material. Furthermore, the fines compartment discharge opening is sealed off with a rotary valve. Thus the air which has conveyed the fines portion through the fan and into the fines compartment can be controlled and caused to leave the system through a valve controlled outlet in a regulated manner variable with the degree of selectivity required.

I find that the operation of such a system materially improves the ability of the machine to make a sharp separation between the fine and coarse products in a mass of material, as well as to regulate further the amount of fine products removed. This method of operating a sealed fan induced air system against a constant pressure, as far as I am aware, differs materially from procedures heretofore known in the art, particularly as I employ no recirculated air in removing the fines from a cascading mass of particles.

I find that the size of the opening through which carrier air is discharged may be regulated very precisely to control the quantity of air flowing into the fan at any given time. The effect of this is to provide for maintaining a relatively high rotative speed of the distributor plate while simultaneously inducing a materially limited flow of air whose lifting power is such as to remove only very fine particles constituting a small fraction of the cascading mass.

I have still further found that in carrying out a separation of very fine particles in the manner above noted, I may utilize a separate collector combined with the fines chamber already described to collect a second fraction of fines as a separate operation. In this way I recover two separate amounts of fine material and I am further enabled to provide two grades of very fine material so that a more efficient collecting is realized.

The nature of the invention and its objects will be more fully understood and appreciated from the following description of a preferred embodiment of the invention selected for purposes of illustration and shown in the accompanying drawings, in which.

Figure 1:
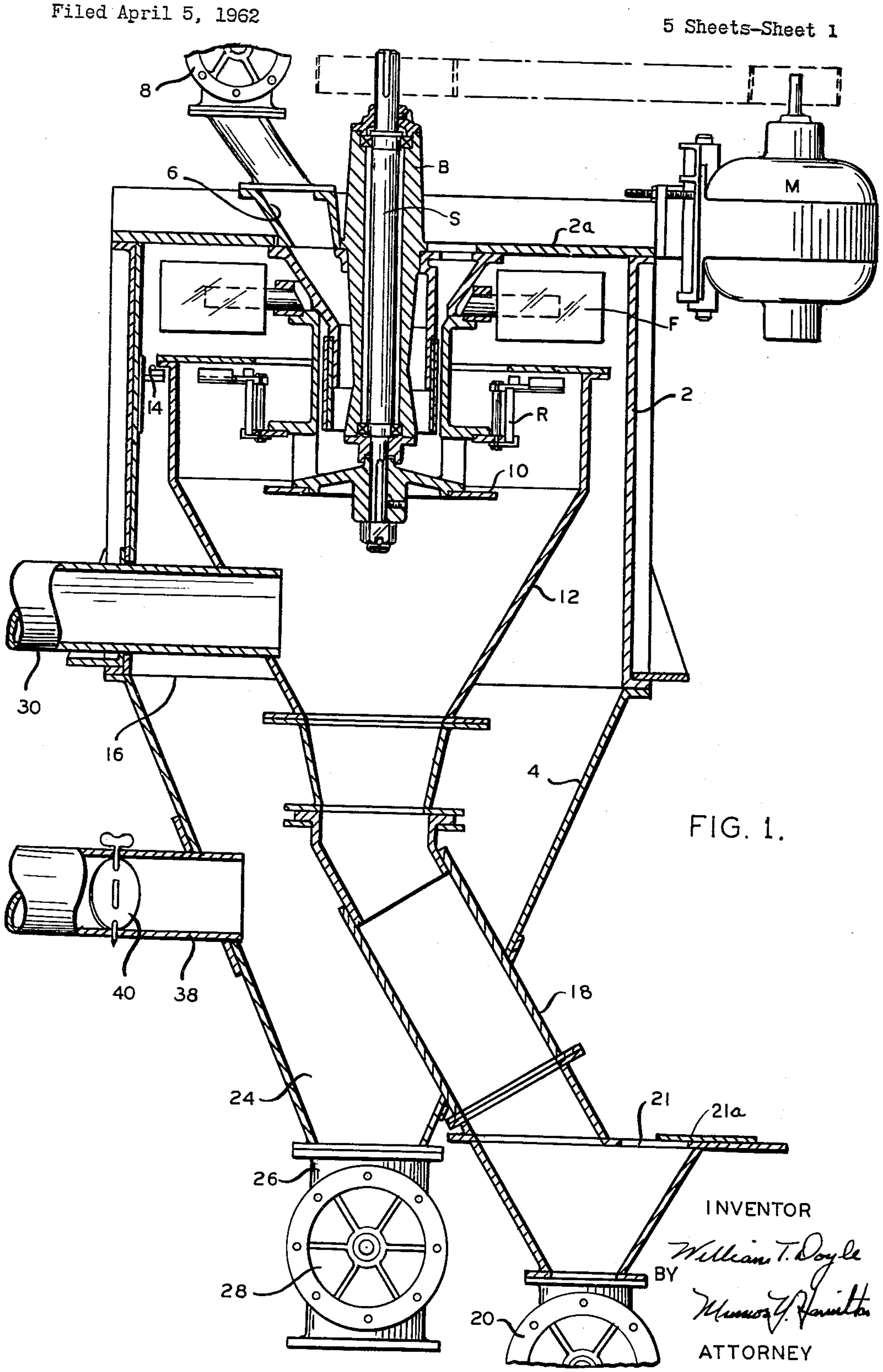
FIG. 1 is a vertical cross sectional view of a portion of the classifier apparatus of the invention.

Considering in further detail the method and apparatus referred to, attention is directed to the structure illustrated in FIG. 1. As shown therein a substantially sealed system is comprised by an outer closed casing 2 which is formed with a conical lower section 4, and a top cover section 2*a*. The section 2*a* has vertically supported therethrough a bearing B in which is received a shaft S driven by a motor M. The shaft has fixed there to a distributor plate 10 and rotating vane sizing device R to which is secured a fan member F. The motor and driving arrangement for fan and plate are conventional.

Pulverized material which is desired to be separated into required fractions is introduced through a feed inlet 6 which at its upper end is closed by a rotary valve 8 of conventional nature. By means of this arrangement, material may be fed into the separator system without permitting a flow of air into the casing to take place.

Material from the feed inlet is received on the rotating plate 10 of the class well known in centrifugal separators of this general nature. Incoming material is centrifugally displaced by the rotating plate to provide for separation of relatively fine particles and relatively coarse particles occurring as a cascading mass. An inner tailings conduit for coarse particles of the free falling mass is comprised by a conical member 12 supported on inner flanges 14 and 16.

The lower end of the conical conduit 12 communicates with a tailings discharge outlet 18 which projects angularly through the section 4 and which is provided with an opening 21 closed by a sliding cover 21*a*, and which is sealed at its lower end by a rotary valve 20. This valve permits discharge of tailings while preventing entrance of any external air into the tailings conduit 12. The tailings conduit 12 is located in spaced relationship to the casing 2 to define an annular outer fines passageway 24. This passageway terminates in a fines outlet 26 which is, in accordance with the invention, also closed by means of a rotary valve 28 so that no flow of air can take place through this outlet. It will be observed that the tailings conduit does not, an any point, communicate with the fines conduit.

Figure 2:
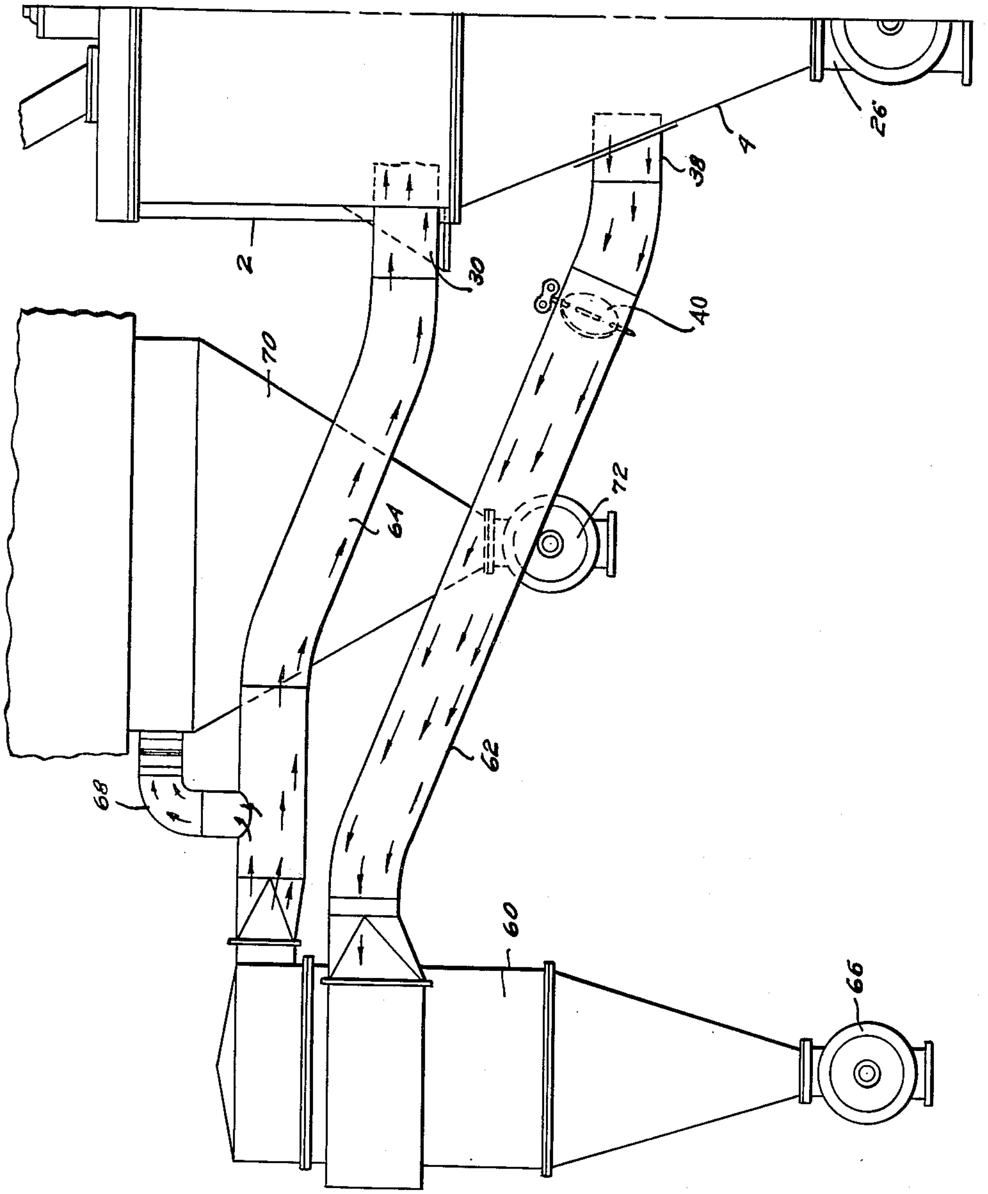
FIG. 2 is an elevational view showing a portion of the classifier and also illustrating a vertical collector apparatus.
Figure 3:
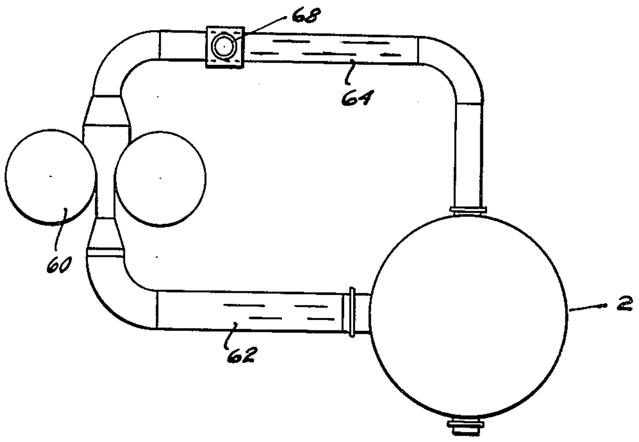
FIG. 3 is a plan view of the classifier and particle collector apparatus shown in FIGS. 1 and 2 omitting the separator.

With this unique closed casing structure, I combine two other novel air controlled components. One component consists of a tubular air inlet 30 and a second component consists of outlet 38. Member 30 is located transversely through both the casing 2 and the inner tailings conduit 12 so that an isolated flow of air may pass into the system as shown in FIG. 2.

The inner extremity of the conduit 30 preferably occurs in a position such that it may conduct the isolated air through the casing 2 and deliver it directly into the path of the free falling mass of particles from the rotating plate 10 above noted and at points where it may be most effectively induced to flow upwardly through the mass of particles. Suction is produced by a fan member F of conventional arrangement as earlier noted.

This upwardly moving fan induced stream of air operates to remove the mass of fine particles in a required range of sizes from the centrifuged material cascaded from the rotating distributor plate. The current of air draws such selected particle sizes through the convention deflector sizing vanes R, which function to size the material, depending upon the spacing and number of vanes employed. The selected particles pass through the fan and are discharged into fines conduit 24, then to the discharge outlet 26, from which they are discharged by the rotary valve 28. This provides one fraction of fines.

An important feature of the invention consists in a valve regulated discharge outlet for the carrier air which is isolated in the fines conduit 24. This valve regulated discharge outlet includes the tubular outlet member 38 which is located transversely through the conical section 4 of the casing at a point below the air inlet member 30, but slightly above the sealed discharge outlet 26, as shown in FIG. 2.

It will be observed that in this position the outlet member 38 occurs at the discharge side of the fan F and therefore constitutes the only available release for air pressure built up in the fines conduit by the action of the fan operating at a normal working speed. In accordance with the invention, I control the rate of flow of air from the outlet 38 by interposing in the outlet 38 a regulator valve which may, for example, consist of a simple damper arrangement 40 such as has been illustrated in FIG. 2. Reducing the cross sectional area of the outlet 38 increases the back pressure of the fan, and with the fan operating at constant speed, the volume of air discharged is reduced. Preferably the outlet 38 is connected to a conventional form of bag collector not shown in the drawings.

A surprising and unexpected result of restricting the flow of air from the discharge outlet 38, is an almost instant change in the percentage by weight which is collected by the carrier air and carried over into the fines conduit. I find that by adjusting the valve setting the percentages released may be made very small and such a small percentage is characterized by a micron size of narrow range which can be selectively removed in a manner not otherwise achieved by commercial structures presently available on the market.

Figure 4:
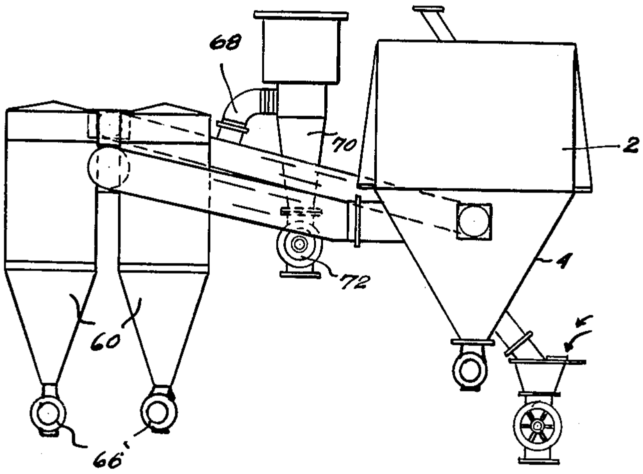
FIG. 4 is a view showing the collector and classifier apparatus in side elevation but viewed at a different angle from that shown in FIG. 2.

In accordance with the invention, I further provide a secondary collecting device consisting of a bag collector 60 which is connected to the outlet 38 as shown in FIGS. 2 and 4. The bag collector 60 includes two conventional cyclone type classifiers arranged side by side as shown, and including conduits 62 and 64 and rotary discharge valve 66. Also a blast gate 68 communicates with another separator 70 having a valve 72.

It is pointed out that desired fines are removed at both the outlet 26 and also at the bag collector connected to the member 38. Thus materials recovered at two points increases the total percentage of fines which can be removed.

As illustrative of working one type of finely divided material, there may be cited the processing of flour in order to remove a fraction of protein particles of very fine size. It should be understood that the usual grain of wheat, for instance, contains the protein commonly known as "Endosterm," to which is attached tiny starch particles. In the course of conventional grinding some of the attached starch particles become dislodged and there results grains having relatively higher percentages of protein contained therein. These high percentages of protein particles are desired for producing certain type of flours. Up to the present time a very difficult problem has been present in attempting to remove a very small fractional part, for example, 10% or possibly less of the total flour mass which represents the protein fraction.

It is pointed out that the size of protein particles in flour may range from 1 or 2 microns up to about 10 to 15 microns, while the remaining particles in the flour may run from about 15 microns all the way up to 50 microns. Moreover, the percentage by weight of protein in a given quantity of flour may range from 5 to 6% all the way up to 14 or 15%. Thus it will be apparent that ideally, from the theoretical standpoint, it might be desirable to remove from 6% up to 15% by weight of a quantity of material, all of whose particles would be in the 1 to 15 micron range. As a practical matter, it has been found to be almost impossible with conventional machines to remove a 6% to 15% fraction of protein without retaining a large percentage of sizes running as high as up to 20 or 30 microns, or higher.

However, the method and machine of the invention has been found to make a significant and unexpected contribution to the art when dealing with this sort of problem. For example, the machine illustrated in the accompanying drawings is designed to operate on a commercial scale and to handle approximately 3,000 pounds per hour of a wheat flour occurring in a ground state in which from about 6% up to 15% by weight of the material is known to be protein particles having sizes of from 1 or 2 microns up to 10 to 15 microns.

I have found that operating the machine shown in the drawings with a commercial grade of ground flour may result in a separation and removal of approximately 10% by weight of the total mass and this 10% fraction is largely composed of protein particles in the 9 to 10 micron range. This is accomplished by adjusting the damper 40 in the outlet member 38 so that the cross sectional discharge area of this member 38 is reduced practically 75% of the total aperture opening of the conduit 38.

In comparison with this, when the damper 40 is completely opened to permit a maximum passage of air through the outlet member 38, it is found that the percentage of material removed may run from 40% to 50% of the total quantity of material processed and of this 40% to 50% the micron sizes may vary from 1 or 2 microns, all the way up to 50 microns.

As further illustrative of processing a commercial grade of flour to remove a desired protein fraction, two examples are noted.

Example I illustrates an air classifying operation in which in control was exercised on the pressure side of the fan, while Example II illustrates a control of back pressure or static pressure in accordance with the invention.

*Example I.*—A sample of commercially ground flour was furnished for processing known to contain a protein fraction of about 15%. The flour showed the following screen analysis:

| | |
|---|---|
| 100% | 50 microns and finer. |
| 74.1% | 30 microns and finer. |
| 66.7% | 20 microns and finer. |
| 14.8% | 10 microns and finer. |
| 7.4% | 5 microns and finer. |

This material was fed at the rate of 3,000 pounds per hour into the inlet port 6 of the machine shown in FIG. 1, through the rotary sealing valve 8. The fan F, and the distributor plate 10, fixed to a common driving shaft, were rotated at approximately 2,500 r.p.m. The casing 2, having a diameter of approximately three feet, was supplied with a constant flow of air through air inlet pipes 30 having an 8 inch diameter. This air drawn in by the fan F was discharged through the outlet pipe 38, also of 8 inch diameter.

At an operating speed of 2,500 r.p.m. and with the air inlet and outlet sizes noted, the fan F operated against a static pressure of 3.6 p.s.i. and delivered 1,250 cubic feet per minute of air. This rate of flow was carried out with the damper 40 completely open in the outlet pipe 38, and the machine removed 51% of the ground flour. The micron size of particles in this 51% fraction ran from about 5 microns all the way up to about 30 microns. This operation thus resulted in an unsatisfactory separation of the fraction of protein known to be present in the flour.

In comparison, in Example II, a second sample of the same amount and kind of flour was run through the machine, keeping all of the above cited values the same, but changing the setting of the damper 40, so that the opening through the discharge pipe 38 was reduced 75%. The total area of the opening before the damper was closed amounted to 50.62 square inches. With the member 40 three-quarters closed, the open area amounted to 9.82 square inches. With this restricted opening, the fan F developed a static pressure of 6.2 p.s.i. and delivered only 630 cubic feet per minute as compared with 1,250 cubic feet per minute.

Running the second sample through the machine with this adjustment separated a fraction of fine particles amounting to approximately 9% to 10% by weight of the material fed into the machine, having a micron size of from about 2 to 5 microns all the way up to 12 to 15 microns, with the average micron size being actually about 7.1 microns. This was found to be a satisfactory removal of approximately all of the protein material in the sample of flour.

I have determined that by varying the back pressure exerted in the system, and by controlling the setting of the selector blades, similarly sharp separations of desired fractions may be accomplished throughout a range of micron sizes, particularly in dealing with the various other materials than flour as noted above. In all of these classifying operations it was clearly evident that the combined effect of a controlled flow of air into the fan cooperating with the particle rejecting function of the rejector blades operated to produce a new and unexpected result of a highly desirable nature.

As illustrative of a specific example of removing two quantities of fines, the following is cited. A quantity of flour was run having an average micron size, at the time it was fed into the machine at the feed inlet 6, of approximately 9.7 microns. This material, it should be understood, included some coarse material running as high as 50 microns, together with the finer particles.

After processing through the machine, utilizing the two collecting devices described above, the coarses removed at the rotary valve 20 showed an average micron size of 12.6. The fines removed at the rotary valve 28 showed an average micron size of 5.4, and the fines removed from the bag collector system showed an average micron size of 4 microns.

Thus there was afforded a desirable separation of fines into two different grades, and a substantial amount of fines that would normally be lost was recovered by the secondary bag collecting system, thus improving the efficiency of the machine. The two different grades of material are adapted to be mixed together, or may be utilized separately of one another for varying purposes.

Figure 5:
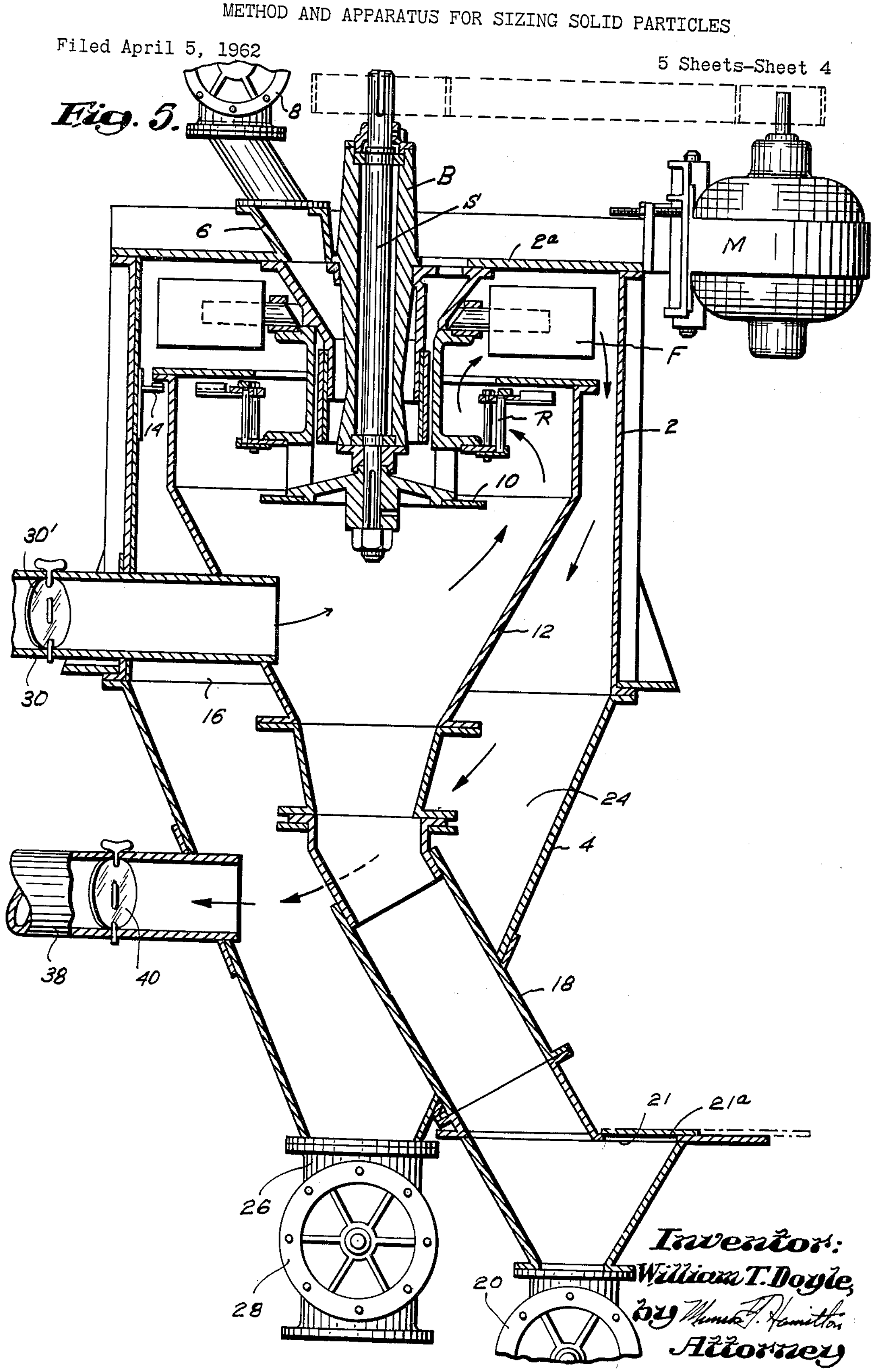
FIG. 5 is a vertical cross sectional view of a modified form of the invention taken centrally of the separator apparatus.
Figure 6:
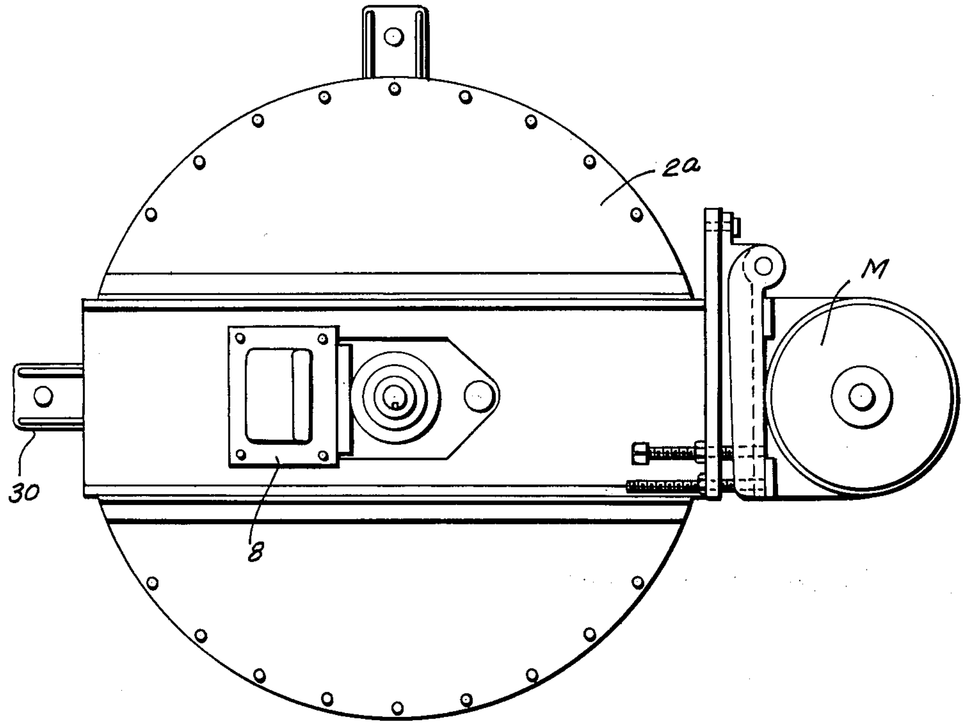
FIG. 6 is a plan view of the apparatus shown in FIG. 5.

The invention may also be practiced in a further modified form in which the air flow through the fan is controlled at the suction side of the fan rather than at the discharge side as illustrated in FIGS. 5 and 6. For example, I may carry out satisfactory separation and removal of protein particles from a sample of flour by retarding the flow of air into the fan. This, I find, may be accomplished by means of a valve device such as the damper 30' arranged in the inlet 30, as illustrated in FIG. 5. In using this damper 30' the outlet 38 is maintained in a fully opened position. The setting of damper 30' is then registered in the manner described with reference to damper 40 to retard air flow to a point at which the small fraction of minute protein particles may be selectively removed in amounts and percentages corresponding to those disclosed in Example II above noted. I may also desire to retard flow by regulating both the dampers 30' and 40 and these members may also be varied in size and setting in predetermined relationship to one another.

It is to be understood that the inner and outer chambers are sealed from each other and that the outer chamber wall is sealed from atmosphere. The only communication between the inner chamber and the outer chamber is through the port at the top of the inner cylinder shell which leads through the vacuum fan and that the discharge through this fan is varied by the control of the air port to the inner cylinder and/or the control of the discharge opening from the outer shell. The modification of the fan volume output is dependent upon the amount of air supplied by the air input to the inner cylinder which is restricted to less than the fan output during operation. This produces the new result set forth above. Likewise, the function of the fan may be modified by varying the output capacity from the outer shell or varying both the air input to the inner shell and the output capacity from the outer shell. These operations result in the new, novel and more efficient operation of the parts as indicated by the examples above set forth.

What I claim is:

1. The method of air classifying, the steps which include delivering a free falling mass of finely divided solid material downwardly upon a rotating distributor plate for centrifugal dispersion within a closed chamber having a top portion with an outlet port formed therein, supplying the air through a conduit means opening into said closed chamber below said dispersing mass, evacuating the air supplied to said chamber upwardly through said finely divided dispersed mtterial by a vacuum fan rotating at a predetermined speed and located at the outer side of the closed chamber with its inlet connected with said outlet port for entraining portions of the dispersed material, traveling the air and entrained material through a rotating sizing device located between the distributor plate and the outlet port of said chamber, discharging the flow of air and entrained material from said vacuum fan into a second closed chamber for deposit of portions of the dispersed material at the bottom portion thereof, providing an air discharge from said second closed chamber above the bottom portion thereof, and controlling the air supplied to said first closed chamber and moved by said vacuum fan to regulate the volume of air flow through said fan while operating at said predetermined speed for obtaining a selective size separation of the particles.

2. The method of air classifying, the steps which include delivering a free falling mass of finely divided solid material downwardly upon a rotating distributor plate for centrifugal dispersion within a closed chamber having a top portion with an outlet port formed therein, supplying the air through a conduit means opening into said closed chamber below said dispersing mass, evacuating the air supplied to said chamber upwardly through said finely divided dispersed material by a vacuum fan rotating at a predetermined speed and located at the outer side of the closed chamber with its inlet connected with said outlet port for entraining portions of the dispersed material, traveling the air and entrained material through a rotating sizing device located between the distributor plate and the outlet port of said chamber, discharging the flow of air and entrained material from said vacuum fan into a second closed chamber for deposit of portions of the dispersed material at the bottom portion thereof, providing an air discharge from said second closed chamber above the bottom portion thereof, and regulating the air permitted to escape from said air discharge for controlling the volume of air flow through said fan while operating at said predetermined speed for obtaining a selective size separation of said particles.

3. The method of air classifying, the steps which include delivering a free falling mass of finely divided solid material downwardly upon a rotating distributor plate for centrifugal dispersion within a closed chamber having a top portion with an outlet port formed therein, supplying the air through a conduit means opening into said closed chamber below said dispersing mass, evacuating the air supplied to said chamber upwardly through said finely divided dispersed material by a vacuum fan rotating at a predetermined speed and located at the outer side of the closed chamber with its inlet connected with said outlet port for entraining portions of the dispersed material, traveling the air and entrained material through a rotating sizing device located between the distributor plate and the outlet port of said chamber, discharging the flow of air and entrained material from said vacuum fan into a second closed chamber for deposit of portions of the dispersed material at the bottom portion thereof, providing an air discharge from said second closed chamber above the bottom portion thereof, controlling the amount of air supplied to said first closed chamber and the amount of air escaping through said air discharge to regulate the volume of air flow through said fan while operating at the predetermined speed for obtaining a selective size separation of particles.

4. In a separator, the combination of an outer closed casing having a cone with its apex at the bottom and a drum above said cone, said drum including a top wall portion, an inner closed casing composed of a cone with its apex at the bottom and a drum above the cone, said drum including a top wall portion, said inner closed casing being spaced from the outer casing and defining a chamber therebetween, normally closed valve means controlling discharge from the bottom of each of said casings, an outlet port formed in the top wall portion of the drum of the inner casing, a vacuum fan mounted between the top wall portion of the inner drum and the top wall portion of the outer drum, said outlet port formed in the top wall portion of the drum of the inner casing providing an inlet to said vacuum fan and forming the sole communication between the chambers defined by said casings, driven shaft means projecting through the top wall of the outer casing and within the inner casing, a centrifugal distributor plate mounted on the lower end portion of said shaft and spaced from the top wall portion of the drum of said inner casing, a rotary sizing device positioned within the inner casing above the distributor plate, tubular means fixed to the centrifugal distributor plate and connecting the vacuum fan and rotary sizing device to provide a uniform continuous rotation of the parts, means discharging finely divided solid material into said inner casing and upon said distributor plate for centrifugal dispersion, air inlet means connected to the inner chamber at a point below the distributor plate for providing air for movement by said fan through the material centrifugally dispersed by said centrifugal distributor plate and said sizing device for discharge out of said outlet port in the inner casing into said vacuum fan for discharge from said fan into the chamber between the inner and outer casings together with the fines entrained thereby, valve means controlling the air inlet means to regulate the rate of air flow through said fan for obtaining a selective size separation of said finely divided solid material, and an air outlet means connected with the outer casing for discharging the air delivered to the outer casing.

5. The structure of claim 4 characterized in that additional valve means are provided in said outlet means to regulate the air flow through said fan.

6. The structure of claim 4 characterized in that a conduit connects the air outlet means for the outer casing with a separator and the separator is connected with said air inlet means for providing solids free air to the inner chamber.

7. In a separator, the combination of an outer closed casing having a cone with its apex at the bottom and a drum above said cone, said drum including a top wall portion, an inner closed casing composed of a cone with its apex at the bottom and a drum above the cone, said drum including a top wall portion, said inner closed casing being spaced from the outer casing and defining a chamber therebetween, normally closed valve means controlling discharge from the bottom of each of said casings, an outlet port formed in the top wall portion of the drum of the inner casing, a vacuum fan mounted between the top wall portion of the inner drum and the top wall portion of the outer drum, said outlet port formed in the top wall portion of the drum of the inner casing providing an inlet to said vacuum fan and forming the sole communication between the chambers defined by said casings, driven shaft means projecting through the top wall of the outer casing and within the inner casing, a centrifugal distributor plate mounted on the lower end portion of said shaft and spaced from the top wall portion of the drum of said inner casing, a rotary sizing device positioned withn the inner casing above the distributor plate, tubular means fixed to the centrifugal distributor plate and connecting the vacuum fan and rotary sizing device to provide a uniform continuous rotation of the parts, means discharging finely divided solid material into said inner casing and upon said distributor plate for centrifugal dispersion, air inlet means connected to the inner chamber at a point below the distributor plate for providing air for movement by said fan through the material centrifugally dispersed by said centrifugal distributor plate and said sizing device for discharge out of said outlet port in the inner casing into said vacuum fan for discharge from said fan into the chamber between the inner and outer casings together with the fines entrained thereby, an air outlet means connected with the outer casing for discharging the air delivered to the outer casing, and valve means controlling said air outlet means to regulate the rate of air flow through said fan for obtaining a selective size separation of said finely divided solid material.

8. The structure of claim 7 characterized in that a conduit connects the air outlet means for the outer casing with a separator and the separator is connected with said air inlet means for providing solids free air to the inner chamber.

References Cited in the file of this patent

UNITED STATES PATENTS

| | | |
|---|---|---|
| 826,772 | Emerick | July 24, 1906 |
| 2,113,885 | Gerhardt | Apr. 12, 1938 |
| 2,350,737 | Eiben | June 6, 1944 |
| 2,790,550 | Doyle | Apr. 30, 1957 |
| 2,939,575 | Hardinge | June 7, 1960 |
| 2,943,735 | Payne | July 5, 1960 |